United States Patent
Gilderman et al.

(10) Patent No.: US 11,360,951 B1
(45) Date of Patent: Jun. 14, 2022

(54) DATABASE MIGRATION SYSTEMS AND METHODS

(71) Applicant: Amazon Technologies, Inc., Seattle, WA (US)

(72) Inventors: Ilia Gilderman, Bellevue, WA (US); Eran Schitzer, Sunnyvale, CA (US); John MacDonald Winford, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 613 days.

(21) Appl. No.: 15/826,295

(22) Filed: Nov. 29, 2017

(51) Int. Cl.
*G06F 16/00* (2019.01)
*G06F 16/21* (2019.01)
*G06F 16/23* (2019.01)

(52) U.S. Cl.
CPC .......... *G06F 16/214* (2019.01); *G06F 16/213* (2019.01); *G06F 16/2379* (2019.01)

(58) Field of Classification Search
CPC ... G06F 16/214; G06F 16/213; G06F 16/2379
See application file for complete search history.

(56) References Cited

U.S. PATENT DOCUMENTS

| | | | |
|---|---|---|---|
| 6,601,233 B1* | 7/2003 | Underwood | G06F 8/24 717/100 |
| 2007/0185926 A1* | 8/2007 | Prahlad | G06F 16/1734 |
| 2010/0192006 A1* | 7/2010 | Gharat | G06F 11/3688 714/5.1 |
| 2015/0046791 A1* | 2/2015 | Isaacson | G06F 40/103 715/234 |
| 2015/0278393 A1* | 10/2015 | Das | G06Q 10/06395 707/601 |
| 2016/0259660 A1* | 9/2016 | Gaurav | G06F 11/3442 |

* cited by examiner

*Primary Examiner* — Diedra McQuitery
(74) *Attorney, Agent, or Firm* — Davis Wright Tremaine LLP

(57) ABSTRACT

A system such as a service of a computing resource service provider includes executable code that, if executed by one or more processors, causes the one or more processors to identify a set of resources associated with a first database system, determine, based at least in part on the set of resources, an expected outcome of an operation of a second database system, and generate, executable code that, if executed, verifies an actual outcome of the operation of the second database system against the expected outcome. The system may be utilized as part of a database migration process where data from a first database system is transferred to a second database system.

21 Claims, 10 Drawing Sheets ns and methods described herein are utilized to perform an automated database migration that includes identifying a set of resources associated with a first database system such as source code, stored procedures (sprocs), database schema, APIs, existing tests, user interface, design documents, input/output data, and more; utilizing the set of resources to generate a test specification template that defines a set of expected outcomes of an operation of a database system (e.g., the expected operation of an existing database environment on which data is stored or the expected operation of a target environment in which the data is to be migrated to) based on an input comprising one or more input parameters; and generating a test script that can be used for integrated, automated testing of the resulting work product. In an embodiment, machine-learning techniques are utilized as part of the generation of the test scripts, and metadata associated with the migration is used to improve the generation of tests as the data set grows.

DATABASE MIGRATION SYSTEMS AND METHODS

BACKGROUND

Database systems are an important part of many organizations. Database systems are, generally speaking, capable of being used to store large amounts of structured data and can be accessed, organized, and manipulated using a database management system. In many cases, organizations own, lease, or otherwise manage the maintenance of database systems for use by the organization (e.g., by employees of the organization), clients of the organization, and more. However, there are many challenges involved in the management and maintenance of database systems. Migration from one database environment to another database environment presents several challenges, such as a risk that one or more features of a database will no longer work as expected after migration (e.g., the operation of the database changes in an unexpected and undesirable manner). Furthermore, migrating a database system from one environment to another often involves the commitment of a large amount of resources of an organization to design test specifications, write test code, and verify that the operation of a database system is as expected. Therefore, due to various challenges such as those described above, many organizations use database systems that operate on platforms that are several decades old, and are reluctant to migrate to modern database platforms because of the risks and costs associated with database migration.

BRIEF DESCRIPTION OF THE DRAWINGS

Various techniques will be described with reference to the drawings, in which.

DETAILED DESCRIPTION

Figure 1:
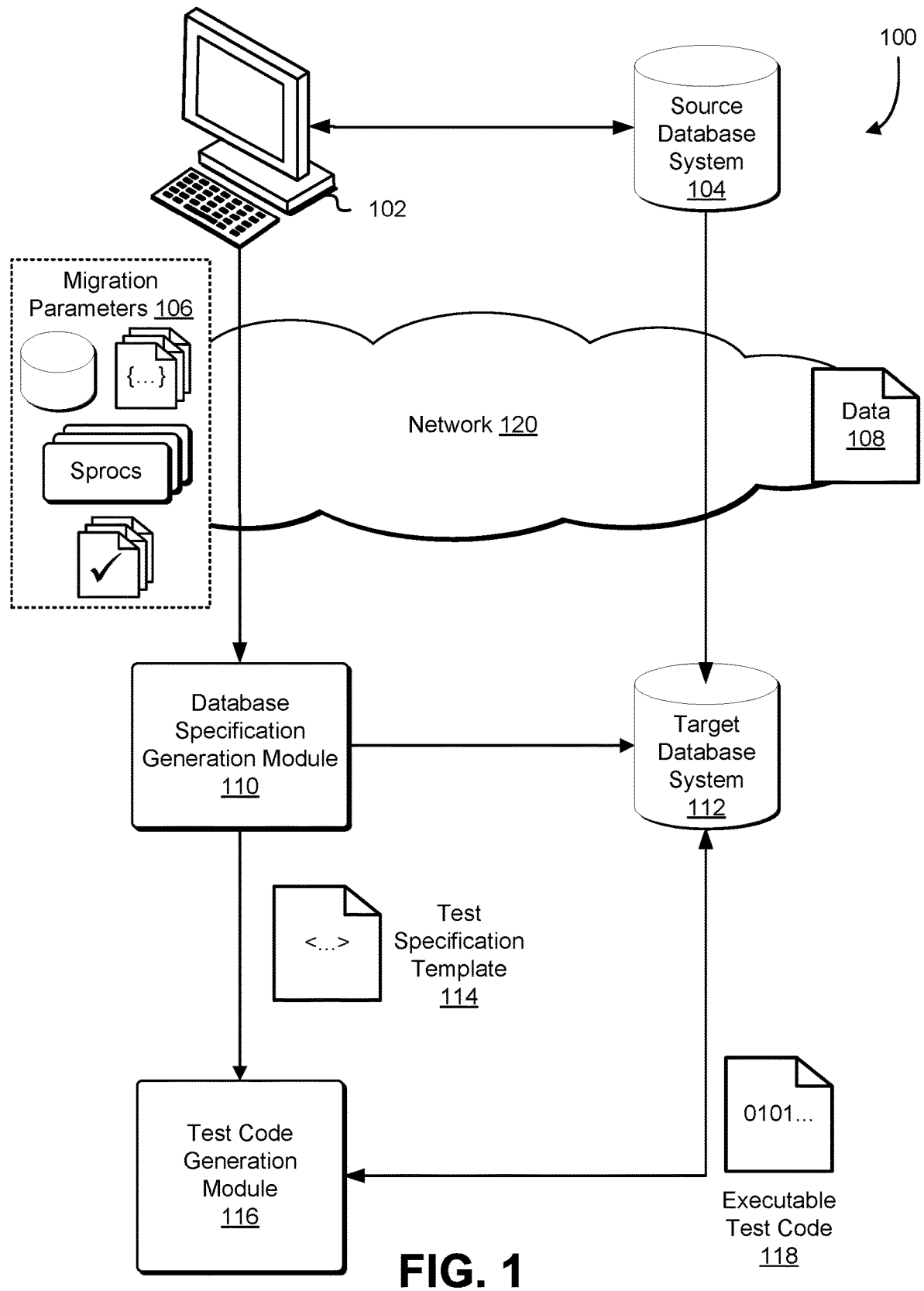
FIG. 1 illustrates a system in which one embodiment may be practiced.

In an embodiment, systems such as those described in this disclosure are utilized to perform various tasks that automatically test and verify the operation of a database system as part of or in connection with the migration of a database system from one environment to another environment. In an embodiment, systems and methods described herein are utilized to perform an automated database migration that includes identifying a set of resources associated with a first database system such as source code, stored procedures (sprocs), database schema, APIs, existing tests, user interface, design documents, input/output data, and more; utilizing the set of resources to generate a test specification template that defines a set of expected outcomes of an operation of a database system (e.g., the expected operation of an existing database environment on which data is stored or the expected operation of a target environment in which the data is to be migrated to) based on an input comprising one or more input parameters; and generating a test script that can be used for integrated, automated testing of the resulting work product. In an embodiment, machine-learning techniques are utilized as part of the generation of the test scripts, and metadata associated with the migration is used to improve the generation of tests as the data set grows.

In an embodiment, migration of a database refers to changing the operating environment of a database from a first environment to a second environment and includes moving an on-premises database system running on one or more servers owned and operated by an organization to a database system operating on one or more servers of a computing resource service provider that hosts and/or operates computing resources on behalf of the organization, and changing a database system from a first platform to another platform (e.g., changing from an Oracle®-based database system to a PostgreSQL-based database system). Accordingly, techniques described herein improve database migration processes by ensuring that the operation of a second database system (e.g., the target environment) is in accordance with expectations that are defined under a test schema that is based at least in part on various aspects of a first database system (e.g., the original or source environment). Thus, systems and methods described herein can be utilized by organizations to ensure the smooth migration of data from legacy database systems and applications built on antiquated technologies (e.g., database technologies developed decades ago that are ill-suited for usage in modern computing scenarios) to modern technologies that are more suitable for the organization's use cases. In an embodiment, an organization uses systems and methods described herein to off-load database-related service and maintenance to a computing resource service provider in a manner that is efficient, reliable, and cost-effective. In an embodiment, modern technologies present several advantages that improve the efficiency, cost, and security of the database system.

In an embodiment, an organization hosts a first database system in an on-premises environment and owns and/or operates one or more servers in a datacenter or office that runs a database application such that members of the organization (e.g., via computer systems) connect to and utilize the database system via the organization's intranet network. In an embodiment, the organization performs a database migration process by causing the provisioning and configuring of a second database system in a different computing environment (e.g., the second database system is software and/or hardware running within the context of a computing resource service provider on one or more servers utilized by the computing resource service provider), transferring data from the first database system to the second database system, generating a set of test scripts that define the expected behavior of the second database system, running the test scripts to determine that the second database system is operating as expected and without issues, and providing an indication that the migration was successful, failed in part, or failed entirely. In an embodiment, the system generates a migration report that includes a report of the various aspects of the migration testing, such as a list of operations that were tested, code coverage information (e.g., a summary and/or detailed information regarding which code branches of the database system were executed and validated as part of the test scripts), and more.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a diagram of a system 100 in which an embodiment in accordance with this disclosure is implemented. In an embodiment, a client computer system 102 operates or otherwise has access to a first database system 104 that is utilized to store, retrieve, destroy, modify, or otherwise maintain data. In an embodiment, the database system is any suitable database system, such as an object-relational database management system (ORDBMS) or relational database management system (RDBMS).

In an embodiment, the client computer system 102 is any suitable computing device that is usable to communicate with or otherwise utilize the first database system 104 to perform various database-related tasks, such as the creation of database volumes, tables, columns, and/or rows. In an embodiment, the database system supports multiple types of accounts such as an administrator account that is able to perform administrative actions such as configuring global settings of the database system and user accounts are able to perform at least some actions in association with the database (e.g., reading and writing data of some but not all tables of a database). However, it should be noted that it is not required that user accounts have access to any privileges in connection with the database system—in an embodiment, user accounts determined to be compromised due to computer viruses and/or malware may have all permissions and access rights revoked. In an embodiment, the client computer system 102 indicates or otherwise causes a database migration in which the operation of a database is transferred at least in part from a first database system 104 to a second database system 112. Generally speaking, a database migration refers to a process, in accordance with one embodiment, in which the operating environment of a database system changes from one environment to another, and includes, but is not limited to, changing the platform on which a database system operates on (e.g., from a MySQL database to a PostgreSQL database), migrating the operation of a database at least in part from an on-premises database solution to a distributed solution in which at least some parts of the database system are implemented by a database system of a computing resource service provider accessible via an external network (e.g., via the Internet), and more. In an embodiment, the client computer system 102 is associated with an administrator account or otherwise has elevated privileges that are used to cause the system to perform a database migration—in contrast, an account such as a guest account with least privileges is not able to initiate a database migration process.

In an embodiment, the first database system 104 refers to data and/or software related to the operation of databases, and includes data of the database, schemas, indices, and database management software that a client of the database utilizes to interact with the underlying data of the database. In an embodiment, a database system refers to an object-relational database management system (ORDBMS) or relational database management system (RDBMS) and both the underlying data stored in the database (e.g., client data) and related data stored in association with the underlying data (e.g., indices used to sort a table of client data in accordance with a defined sort order). A database system (also referred to as database server), in an embodiment, refers to those commercially available from Oracle®, Microsoft®, Sybase®, and IBM® as well as open-source servers such as MySQL, PostgreSQL, SQLite, MongoDB, and any other server capable of storing, retrieving, and accessing structured or unstructured data. In an embodiment, the first database system 104 includes various database parameters that define various aspects of the database such as database schema that defines tables, columns, sort orders, and more. In an embodiment, resources associated with a database include: source code, stored procedures (sprocs), database schema, APIs, existing tests, user interface, design documents, input/output data, and more. In an embodiment, source code includes source code that can be used to compile and generate executable code for the database management system, applications running on the database management system, test code such as unit tests and build verification tests that are used to verify the behavior of the database management system (e.g., API behavior) and/or applications that utilize the database management system. In an embodiment, stored procedures (sprocs) refer to subroutines that clients of a database system are able to invoke and access and/or otherwise interact with data of the database system in a manner that would not violate ACID properties (i.e., requirements of at least Atomicity, Consistency, Isolation, and Durability) of database operations. In an embodiment, a stored procedure writes a first record to a database and an associated record in another table of the database that references the first record within a transaction such that the first record and associated record are committed in an all-or-nothing manner such that the associated record will not be committed to the database system unless the first record is also committed, thereby ensuring that there is not an orphaned reference (e.g., as would result if the associated record is successfully created but creation of the first record failed).

In an embodiment, the client computer system obtains a set of parameters 106 associated with the first database system that is routed (e.g., via one or more networks) to a database specification generation module 110. In an embodiment, the set of parameters includes at least some of: source code, stored procedures (sprocs), database schema, APIs, existing tests, user interface, design documents, input/output data, combinations thereof, and more. In an embodiment, the set of parameters 106 or portions thereof are obtained by querying the first database system (e.g., the client computer system issuing API calls to query the first database system for various information related to the database schema, database configuration parameters, and more), obtaining source code (e.g. from a source code depository). In an embodiment, the set of parameters 106 is provided or otherwise made available to a database specification generation module 110 as part of a database migration process. In an embodiment, the database specification generation module 110 includes executable code that, if executed by one or more processors of one or more computer systems, causes the one or more computer systems to receive a set of resources associated with a database migration (e.g., the set of parameters 106 illustrated in FIG. 1) and utilize the set of resources to generate a test specification template 114 that defines a set of expected outcomes of an operation of a database system (e.g., the expected operation of an existing database environment on which data is stored or the expected operation of a target environment to which the data is to be migrated based on an input comprising one or more input parameters. The database specification generation module 110, in an embodiment, includes executable code in the form of an executable application or a dynamically linked library that is loaded to and configured to run on one or more computer systems or computer servers of a service of a computing resource service provider such as a database migration service described in connection with FIG. 6.

Generally speaking, some or all data that is stored in the database system is migrated and includes, for instance, client data, metadata associated with the client data (e.g., synchronization information), and more. In an embodiment, some data in the database system is not directly transmitted across the network 120 but rather is derived at the second database system 112. In an embodiment, a system decreases the amount of bandwidth and network traffic utilized as part of a database migration by omitting indices and calculated values of the database that are derivable from other data that is transmitted over the network 120 and re-generates or calculates such data at the second database system 112 after receiving the baseline data. In an embodiment, baseline data includes data stored in a column of a table, and indices are calculated at the second database system 112 so as to save data storage and/or bandwidth that would otherwise be required for transmitting the indices. In an embodiment, the indices (or, more generally, calculated properties) are transmitted as well as computed to ensure that the transmitted and computed values match, which can be utilized as part of an integrity verification process to ensure the integrity of the transmitted data. In an embodiment, checksums, hash values, and the like are usable as part of an integrity verification process where a system such as a database migration service of a computing resource service provider hosted on one or more servers of the computing resource service provider includes executable code that, if executed by one or more processors of the one or more servers, causes the one or more servers to receive baseline data and derived data, generate the expected values of the derived data from the baseline data, and determine whether the received derived data matches the expected value generated from the baseline data.

In an embodiment, at least some data 108 (e.g., records of data stored on behalf of a client or portions thereof) is transferred from the first database system 104 to the second database system 112. In an embodiment, data transfer between the first database system 104 and the second database system 112 is facilitated using one or more networks such as the network 120 illustrated in FIG. 1. It should be noted that, in an embodiment, the data transfer utilizes one or more clients of the first database system 104 as part of the transfer (e.g., the client computer system 102 queries data from the first database system 104 and sends the data to a computing resource service provider via an interface and the data is routed to a database service that stores the data in a backend database system such as the second database system 112). In an embodiment, the data 108 is transferred using a suitable network such as the network 120 illustrated in FIG. 1, but other devices and techniques can also be used to facilitate the transfer of data. In an embodiment, a network-attachable transfer device is utilized to transfer data and includes components such as, but not limited to: random access memory (RAM); one or more security modules; persistent data storage; a processor; an electronic display; a human interface device; and a network interface. In an embodiment, the network attachable data transfer device may be enclosed in a tamper-proof enclosure.

The set of parameters 106 is transmitted as part of a database migration process to a database specification generation module 110 in accordance to one embodiment. In an embodiment, the database specification generation module 110 is hardware and/or software hosted on one or more computer servers of a computing resource service provider and includes executable code that, if executed by one or more processors of the one or more servers, receives the set of parameters 106 and processes them to determine a test specification template 114. In an embodiment, the database specification generation module 110 includes executable code in the form of an executable (e.g., an application), dynamically or statically linked libraries, scripts, etc. that can be stored on memory of one or more computer systems of a computing resource service provider. In an embodiment, database migration is managed at least in part by a database migration of the computing resource service provider that includes multiple services such as a virtual computer system service, a data storage service (e.g., for block-level storage), a database service (e.g., for hosting and operating a database management system that manages access to a database). In an embodiment, the database specification generation module 110 includes executable code that, if executed by one or more processors of one or more servers of a computing resource service provider, causes the one or more processors to determine database configuration settings that are usable to initialize or otherwise provision a database system such as the second database system 112 illustrated in FIG. 1.

In an embodiment, the second database system 112 refers to data and/or software related to the operation of databases, and includes data of the database, schemas, indices, and database management software that a client of the database utilizes to interact with the underlying data of the database. In an embodiment, the second database system 112 includes software that runs on one or more servers of a computing resource service provider. In an embodiment, the computing resource service provider includes various services that implement various functionality, such as a virtual computer system service, a data storage service (e.g., for block-level storage), and a database management service. In an embodiment, data and data objects transferred from the first database system 104 are stored using the second database system 112. In an embodiment, the first database system 104 utilizes a first database management platform and the second database system 112 utilizes a second database management platform. In an embodiment, the first database system 104 is an Oracle-based database system and the second database system 112 is a PostgreSQL-based database system. In an embodiment, the database migration process is utilized as part of a modernization process in which an organization modernizes the database system it uses by migrating to a newer platform.

In an embodiment, a database system (or related term such as a "database" or "data store") refers to an object-relational database management system (ORDBMS) or relational database management system (RDBMS) and both the underlying data stored in the database (e.g., client data) and related data stored in association with the underlying data (e.g., indices used to sort a table of client data in accordance with a defined sort order). A database system (also referred to as a database server), in an embodiment, refers to those commercially available from Oracle®, Microsoft®, Sybase®, and IBM® as well as open-source servers such as MySQL, PostgreSQL, SQLite, MongoDB, and any other server capable of storing, retrieving, and accessing structured or unstructured data.

A test code generation module 116, in an embodiment, includes executable code that, if executed by one or more processors of one or more computer systems of a computing resource service provider, causes the one or more services to generate executable code such as applications, libraries, scripts, etc. that can be used for integrated automated testing of a migration of a database system from one environment to another. In an embodiment, the test code generation module 116 includes executable code that runs as part of a database migration service of a computing resource service provider and is configured to receive a test specification template 114 and generate test code 118 from at least the test specification template 114. In an embodiment, the test code 118 is further generated based on database configuration parameters of the first and/or second database systems including, but not limited to: source code, stored procedures (sprocs), database schema, APIs, existing tests, user interface, design documents, input/output data, and more. In an embodiment, the test code 118 is executable code that is used to exercise at least some aspects of the operation of a database system. The test code 118, in an embodiment, is utilized to verify that the operation of a stored procedure functions the same in a first database system and a second database system, and is utilized to verify that data objects of a relational database behave as expected after a transition from a first database system to a second database system. In an embodiment, the test code generation module 116 runs the test code 118 to verify the operation of the second database system 112 by providing a set of inputs that exercise some operations of the second database system 112, receives an actual outcome from the second database system 112 performing the operations specified in the test code 118, and compares the actual outcome to an expected outcome that was specified in the test code 118, the expected outcome determined at least in part from the test specification template 114. In an embodiment, the expected outcome and the actual outcome match, and the test is deemed to have passed. The test code generation module 116, in an embodiment, includes executable code in the form of an executable application or a library (e.g., a dynamically linked library) that is loaded to and configured to run on one or more computer systems or computer servers of a service of a computing resource service provider such as a database migration service described in connection with FIG. 6.

In an embodiment, a system with access to the source code associated with a database system tracks the lines of code that were exercised as part of the test (e.g., the corresponding executable code to a particular line of code was executed as part of a particular successful test) and keeps track of which lines of code have been exercised and which have not been exercised, thereby generating code coverage information that can be provided in summary format, such as a report that indicates what percentage of code of the second database system 112 has been exercised as part of a database migration process, which can further be broken down to identify the test coverage of portions of the source code, such as the degree to which various stored procedures (sprocs) have been tested (e.g., 0% coverage, indicating that the stored procedure is untested and may not behave as expected, 100% coverage, indicating that stored procedure operated as expected in its entirety, and various levels of coverage in between no coverage and full coverage).

The network 120 illustrated in FIG. 1, in accordance with one embodiment, is any suitable network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In an embodiment, the network includes the Internet and/or other publicly-addressable communications network, as the environment includes a web server for receiving requests and serving content in response thereto, although for other networks an alternative device serving a similar purpose could be used as would be apparent to one of ordinary skill in the art.

Figure 2:
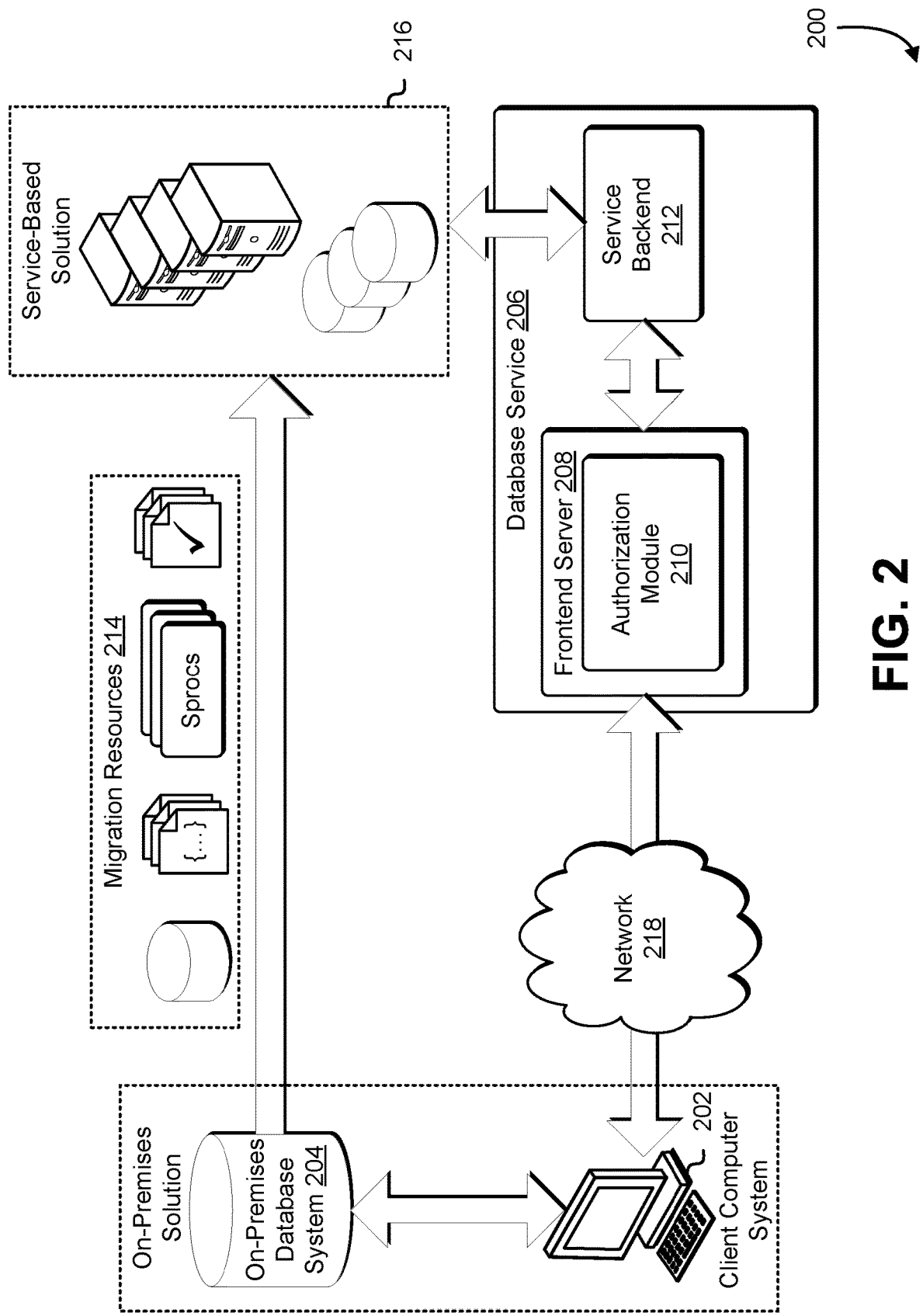
FIG. 2 illustrates a diagram of a system that implements various aspects of the present disclosure in accordance with an embodiment.

FIG. 2 illustrates a diagram of a system 200 in which an embodiment in accordance with this disclosure is implemented. In an embodiment, FIG. 2 is a diagram illustrating the migration of an on-premises database solution to a service-based solution. A client computer system 202 and an on-premises database system 204 form at least part of an on-premises database solution in accordance with one embodiment. An on-premises solution, in an embodiment, refers to a computing environment in which a database system is hosted on computer systems such as computer hardware that an organization operates and maintains. In an embodiment, an organization owns and/or leases one or more computer servers in a data center and the computer servers include: one or more physical processors that run software code for the operation of a database management system; and one or more data storage devices for storing data of the database such as data files and transaction log files. In an embodiment, the on-premises database system 204 and one or more client computer systems 202 of the organization communicate via an internal network (e.g., an intranet) that is not publicly accessible to entities outside of the organization. In an embodiment, the client computer system 202 communicates or otherwise utilizes the on-premises database system 204 to perform tasks such as creating, reading, updating, and deleting structured data of a database. In an embodiment, an organization owns, leases, or otherwise maintains significant control and responsibility of computing resources such as one or more client computer systems that are connected via a network (e.g., a company intranet) to the on-premises database system 204.

In an embodiment, the migration of an on-premises database solution to a service-based solution results in a client computer system 202 utilizing or being able to utilize a service of a computing resource service provider to fulfill requests to interact with a database system. In an embodiment, the database service 206 is one among several services of a computing resource service provider that can be used to obtain resources or obtain access to resources related to the operation of a database system. In an embodiment, the database service 206 includes a frontend server 208 and a service backend 212, but in other embodiments one or more of the components of the service shown in FIG. 2 are performed by other components—i.e., the frontend server, service backend, and respective subcomponents therein do not necessarily need to be part of the database service 206 but are, in an embodiment, part of a separate component accessible by the database service 206.

The client computer system 202 communicates with the database service 206 using web service API requests where, in accordance with one embodiment, the web service API requests are handled at least in part by a frontend server 208. In an embodiment, the frontend server 208 is implemented using hardware, software, or a combination thereof, and the frontend server 208 further includes an authorization module 210 or communicates with an authorization service that is a subservice of the frontend server or may be a separate component from the frontend server. In an embodiment, the frontend server 208 is configured to receive API requests from a requestor such as the client computer system 202, determine whether to grant the request, and access a service backend 212 to fulfill the request. The network 218 illustrated in FIG. 2, in accordance with one embodiment, is any suitable network that the client computer system 202 and database service 206 utilize to communicate, including an intranet, the Internet, a cellular network, a local area network, a satellite network or any other such network and/or combination thereof. In an embodiment, the network 218 is a unidirectional network.

In an embodiment, the authorization module 210 includes executable code that, if executed by one or more processors of one or more servers, causes the one or more processors to determine whether and/or how to fulfill a request. In an embodiment, the authorization module 210 is implemented as a standalone service, as a subservice of the frontend server 208 or database service 206. In an embodiment, the authorization module 210 determines the permissions associated with a principal requesting access to one or more resources (e.g., computing resources for a service-based database solution 216 accessible by a service backend) by parsing a request, determining the permissions associated with the requestor, and determining how to handle the request. The authorization module 210 uses an authentication service (not illustrated in FIG. 2) to authenticate that the identity of the requestor is who it purports to be, in accordance with one embodiment, and the authorization module makes a determination of whether the requestor should be granted access to one or more resources by checking security policies attached to the request resource, the requestor, the token, or some combination thereof. In an embodiment, a web service API request includes a request to access a resource, and the requested resource has a corresponding access control list that describes which principals (e.g., user accounts, groups, roles) are allowed to the resource. The access control list also includes, in accordance with one embodiment, a blacklist of principals that affirmatively may not access the resource and may supersede any other policies ostensibly granting the blacklisted principal access to the resource.

The frontend server 208 is configured, in accordance with one embodiment, to communicate with a service backend 212 that is used to access one or more computing resources utilized to implement the service-based database solution 216. In an embodiment, the resources for the service-based database solution 216 include compute instances (e.g., virtual machine instances used to run database management software) and data storage devices (e.g., block-level storage devices that store data files and transaction log files).

In an embodiment, the migration resources 214 include a set of resources (also referred to as a set of parameters) associated with the on-premises database system that are usable to create, initialize, instantiate, or otherwise provision a database system using the computing resources for the service-based database solution 216 controlled by the database service 206. In an embodiment, the migration resources 214 or a portion thereof are utilized to determine a set of parameters that is used to configure a database system on a computing resource service provider. In an embodiment, the migration resources 214 are determined by querying a set of configuration settings from the first database setting such as settings related to the administration of the database, database schema, indexing information, and more. In an embodiment, the service-based database solution includes a database system that is created, initialized, instantiated, configured, or otherwise provisioned in accordance with the migration resource 214. In an embodiment, the on-premises database solution and the service-based database solution both use database systems that share the same database platform. In an embodiment, the on-premises database system and the service-based database system both run a MySQL database system having the same database configuration settings which includes database schema, indexing information, and more. In an embodiment, the migration resources 214 include source code, stored procedures (sprocs), database schema, APIs, existing tests, user interface, design documents, input/output data, and any other information usable to determine the expected outcome of an operation of a database system and/or determine a test specification template such as those described elsewhere in this disclosure.

Figure 3:
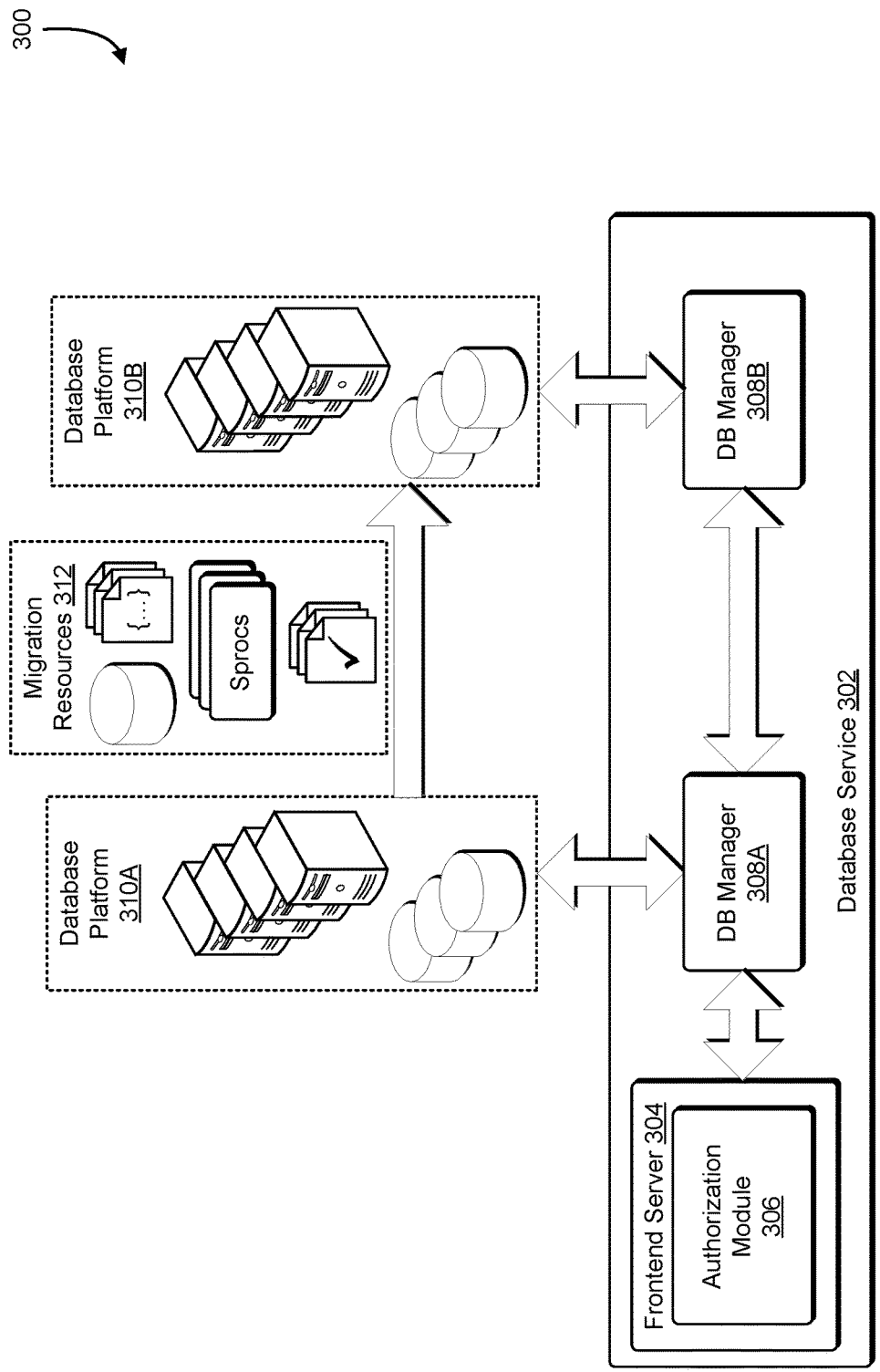
FIG. 3 illustrates a diagram of a system that implements various aspects of the present disclosure in accordance with an embodiment.

FIG. 3 illustrates a diagram of a system 300 in which an embodiment in accordance with this disclosure is implemented. In an embodiment, FIG. 3 is a diagram illustrating a database migration of a service-based database solution from one database platform to another database platform. In an embodiment, a system in accordance with FIG. 2 performs a database migration of an on-premises database solution to a service-based solution and then performs a migration of the service-based database solution from a first platform (e.g., the same platform as the on-premises database solution) to a second platform as part of a database modernization process.

In an embodiment, the database service 302 illustrated in FIG. 3 is implemented in accordance with database servers described elsewhere in this disclosure, such as those described in connection with FIGS. 1 and 2. In an embodiment, the database service 302 is a service of a computing resource service provider that is hosted on one or more computer servers and includes executable code that, if executed by one or more services, performs a database migration process, fulfills requests to perform database operations (e.g., creating, reading, updating, and deleting records of a database system), and more. In an embodiment, the frontend server 304 and the authorization module 306 illustrated in FIG. 3 are implemented in accordance with those described elsewhere in this disclosure, such as those described in connection with FIGS. 1 and 2. In an embodiment, a client computer system transmits a web service API request, the frontend server 304 and the authorization module 306 determine whether to fulfill the request.

In an embodiment, a database service 302 is configured with a first database manager 308A that is used to fulfill requests to utilize a first database platform 310A that utilizes computing resources of a computing resource service provider such as virtual machine instances and data storage services. In an embodiment, a client of the database service 302 indicates as part of a web service API request to perform a database migration from a first database platform 310A to a second database platform 310B—different platforms, in an embodiment, refer to difference database technologies, such as an upgrade of an older version of a database management system application to a newer version of the same database management system application. In an embodiment, different platforms refer to different database technologies such as a database migration from an Oracle®-based database system to a PostgreSQL-based database system.

In an embodiment, the database manager 308A is a software component that includes executable code that, if executed by one or more processors, causes the one or more processors to receive requests and fulfill them. In an embodiment, a request is a request from a frontend server 304, a request for database configuration parameters from another database manager, and more. In an embodiment, a database manager is a software module that is executed on a service backend such as a service backend described in connection with FIG. 2. In an embodiment, a first database manager 308A receives a request to perform a database migration on a first database platform 310A. In an embodiment, the request includes parameters that indicate a target environment. In an embodiment, the request is used to create, initialize, or otherwise make usable a second database manager 308B and provisions a second database platform 310B. In an embodiment, migration resources 312 such as those described in connection with FIGS. 1 and 2 are utilized to determine an appropriate database configuration of the target database platform 310B. In an embodiment, data, schema, stored procedures (sprocs), and test code are migrated from the a source database platform 310A to a target database platform 310B in accordance with processes described in this disclosure, such as those discussed in connection with FIGS. 7 and 8.

Figure 4:
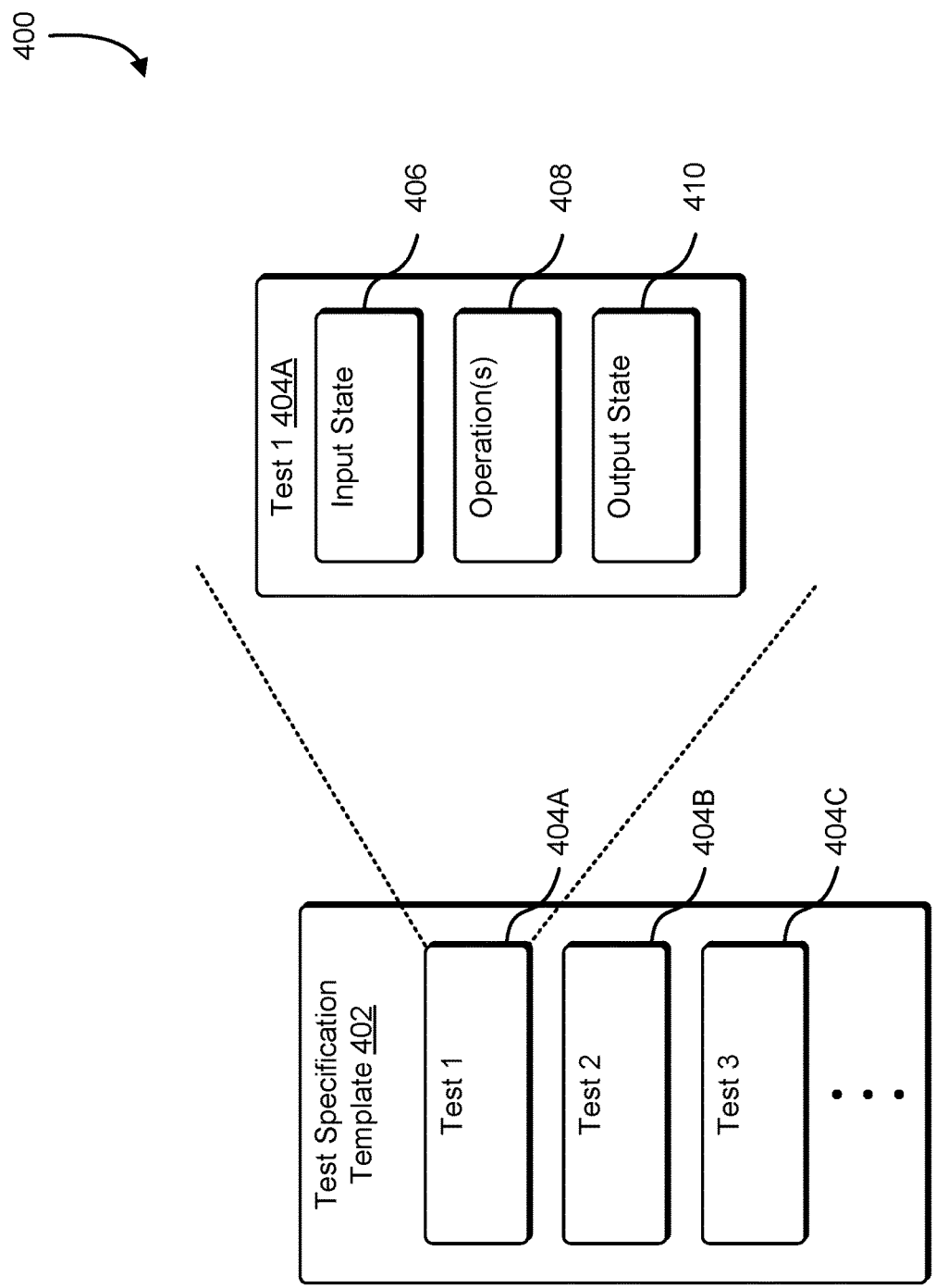
FIG. 4 illustrates a diagram of a test specification template, in accordance with one embodiment.

FIG. 4 illustrates a diagram 400 of a test specification template 402, such as those described in connection with FIG. 1. In an embodiment, the test specification template 402 is encoded in any suitable format such as in Extensible Markup Language ("XML"), JavaScript, Cascading Style Sheets ("CS S"), JavaScript Object Notation (JSON), and/or another appropriate client-side structured language. In an embodiment, the test specification template 402 includes one or more test cases (e.g., test cases 404A, 404B, and 404C illustrated in FIG. 4) and, for a particular test case, defines various parameters such as an initial database state 406, one or more operations to perform 408, and an expected output state 410. In an embodiment, an XML file or portion thereof associated with a test specifies a sequence of operations to be performed one after another serially, operations to be performed asynchronously, operations to be performed in parallel, and any combination there.

Additionally, in an embodiment, the test specification template 402 specifies an expected outcome, which includes the result of a particular operation, the end state of a database, a determination of whether the operations completed within a threshold duration of time, as well as other outcomes and types of outcomes that can be specified in a structured language such as XML, JSON, and more. In an embodiment, the test specification template 402 is encoded as an XML file and encodes one or more tests, wherein a test comprises: an initial database state; one or more operations to perform, wherein some of the one or more operations include additional inputs encoded as XML; an expected output comprising an expected database state; additional operations to perform as part of a validation; and more. In an embodiment, an input of an input/output pair refers to, for a particular test, the initial database state, the input to an operation of the database and an output of an input/output pair refers to an expected database state and/or the additional verification operations. In an embodiment, a database migration process involves utilizing a set of resources to determine a test specification template defining at least one input-output pair that indicates an expected outcome of an operation of a database system as a result of migrating data and/or code. In an embodiment, the test specification template 402 is generated by a database specification generation module such as those described elsewhere in this disclosure, such as in connection with FIG. 1. In an embodiment, the database specification generation module is a software module that is a part of a database migration service of a computing resource service provider.

Figure 5:
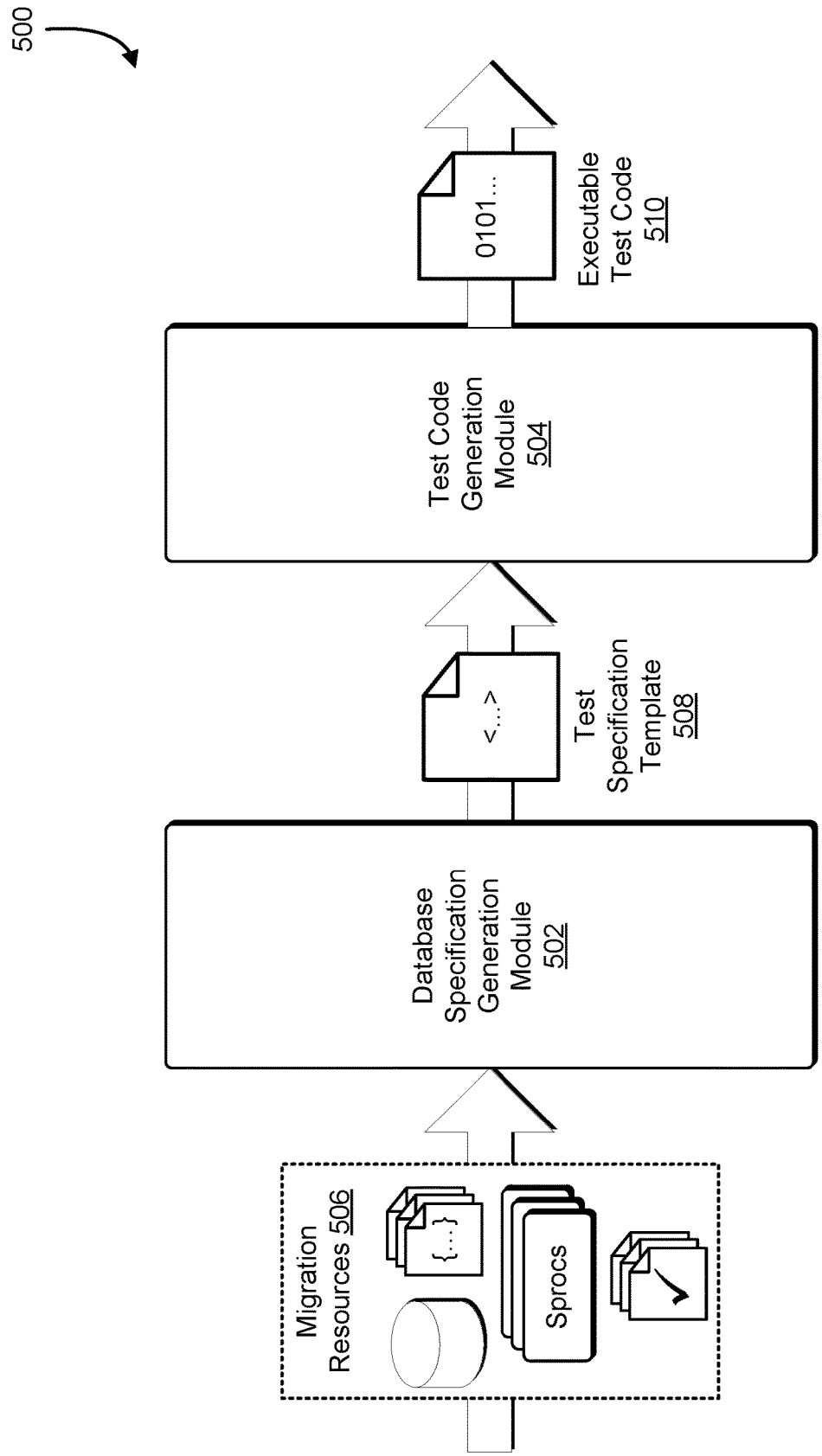
FIG. 5 illustrates a diagram of various aspects of a database migration process, in accordance with one embodiment.

FIG. 5 illustrates a diagram 500 describing the interaction between various components as part of an automatic test generation flow. In an embodiment, the database specification generation module 502 is implemented using hardware, software, or a combination thereof. In an embodiment, the database specification generation module 502 includes executable code that, if executed by one or more processors of one or more computer systems (e.g., computer servers of a computing resource service provider), causes the one or more computer systems to receive migration resources 506 associated with a database migration (and utilize the set of resources to generate a test specification template 508 that defines a set of expected outcomes of an operation of a database system (e.g., the expected operation of an existing database environment on which data is stored or the expected operation of a target environment to which the data is to be migrated) based at least in part on the received migration resources 506. In an embodiment, the migration resources 506 are a set of resources (also referred to as a set of parameters) associated with a source (e.g., original) database system that are usable to create, initialize, instantiate, or otherwise provision a destination (e.g., target) database system as part of a database migration process. In an embodiment, the migration resources 506 include source code, stored procedures (sprocs), database schema, APIs, existing tests, user interface, design documents, input/output data, and more that are usable to generate a test specification template 508. In an embodiment, source code, executable code, schema, and various other properties of a source database system are parsed and mapped to corresponding properties and values of a target database system.

In an embodiment, the test specification template 508 is encoded as an XML file and encodes one or more tests, wherein a test comprises: an initial database state; one or more operations to perform, wherein some of the one or more operations include additional inputs encoded as XML; an expected output comprising an expected database state; additional operations to perform as part of a validation; and more. In an embodiment, the test specification template is in accordance with those described in connection with FIG. 4.

A test code generation module 504, in an embodiment, includes executable code that, if executed by one or more processors of one or more computer systems of a computing resource service provider, causes the one or more services to generate executable code such as applications, libraries, scripts, etc. that can be used for integrated automated testing of a migration of a database system from one environment to another. In an embodiment, the test code generation module 504 receives the test specification template 508, parses the test specification template, and generates executable test code 510 from at least the test specification template 508.

In an embodiment, the test code generation module 504 obtains the test specification template 508 (e.g., from memory, storage, encoded as part of a request, etc.) and information indicating a target database platform and generates executable test code 510 that, if executed, is able to verify one or more operations of a database system associated with the target database platform. In an embodiment, the test specification template 508 generates a first set of executable test code if the target database platform is a particular platform and generates a different set of executable test code if the target database platform is a different type of platform (e.g., executable test code generated for Oracle®-based and PostgreSQL-based database target platforms are different) by determining the target database platform, obtaining a mapping from template elements (e.g., XML tags) to operations and/or commands of the target database platform, and generating test code based on the mapping. Generally speaking, an operation, in this context, refers to any suitable database functionality such as read and write operations, but also includes subroutines that can comprise a series of database operations, logic, and more. In an embodiment, a stored procedure is a type of subroutine. In an embodiment, the executable test code 510 is further generated based on database configuration parameters including, but not limited to: source code, stored procedures (sprocs), database schema, APIs, existing tests, user interface, design documents, input/output data, and more. In an embodiment, the executable test code 510 is executable code that is used to exercise at least some aspects of the operation of a database system—executable test code 510, in an embodiment, is utilized to verify that the operation of a stored procedure functions the same in a first database system and a second database system and is utilized to verify that data objects of a relational database behave as expected after a transition from a first database system to a second database system. In an embodiment, the executable test code 510 is run using computing resources of a computing resource service provider.

Figure 6:
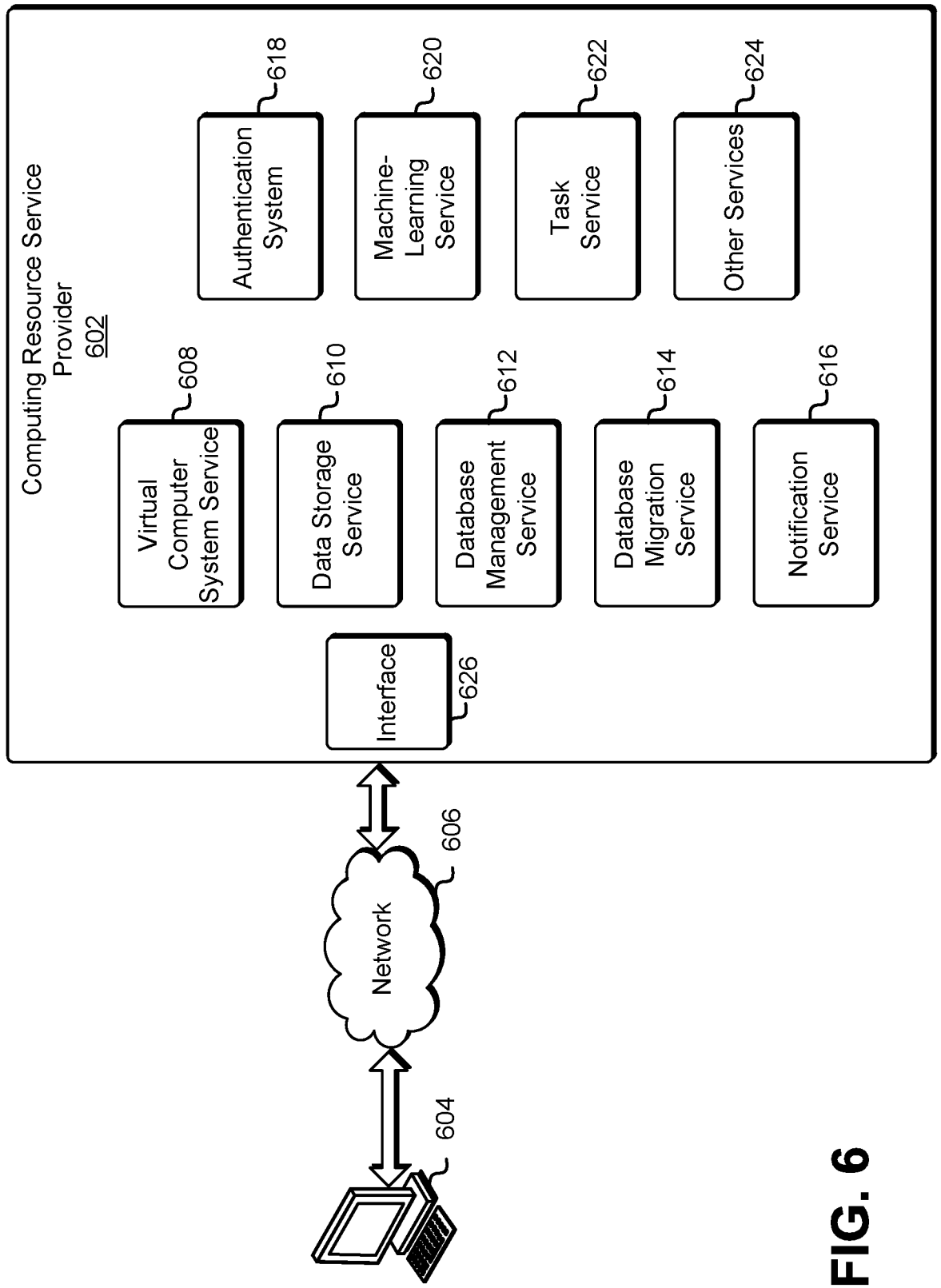
FIG. 6 illustrates a system in which one embodiment may be practiced.

FIG. 6 shows a client computer system connected to a computing resource service provider in accordance with at least one embodiment. The computing resource service provider 602 provides a variety of services to the client computer system 604 and the client computer system 604 communicates with the computing resource service provider 602 via an interface 626, in accordance with an embodiment. The interface 626, in an embodiment, is a web services interface or any other type of customer interface configured to receive API calls from the client (e.g., via the client computer system 604) and, to fulfill the API calls, causes respective services to perform various operations such as described above. Each service of the computing resource service provider 602 is, in an embodiment, implemented as a computer system (e.g., a distributed computer system comprising multiple computing devices, each with one or more respective processors, that communicate over a network) that operates according to executable instructions stored collectively on a set of computer-readable storage media, where individual computer-readable storage media may each have a portion of the instructions for causing a respective device of the computer system to operate. In an embodiment, at least some of the services are interoperable, thereby forming a larger distributed computer system made up from individual distributed computer systems each that operates a respective service. While FIG. 6 shows one interface 626 for the services of the computing resource service provider 602, in an embodiment, each service has a respective interface and, generally, subsets of the services have corresponding interfaces in addition to or as an alternative to the interface 626. In an embodiment, the client computer system 604 is a computer device of an organization that utilizes one or more of the services provided by the computing resource service provider 602 on behalf of the organization to maintain and deliver information to its employees located in various geographical locations around the world. As shown in FIG. 6, the client computer system 604, in an embodiment, communicates with the computing resource service provider 602 through a network 606, whereby the network 606 is a communication network, such as the Internet, an intranet or an Internet service provider (ISP) network. Some communications from the client computer system 604 to the computing resource service provider 602 cause the computing resource service provider 602 to operate in accordance with one or more embodiments described or a variation thereof.

The computing resource service provider 602, in an embodiment, provides various computing resource services to its customers, and the services provided by the computing resource service provider 602 include various services such as a virtual computer system service 608, a data storage service 610, a database management service 612, database migration service 614, a notification service 616, an authentication system 618, a data analytics/machine-learning service 620, a task service 622, and one or more other services 624. It is noted that not all embodiments described include the services 608-24 described with reference to FIG. 6 and additional services may be provided in addition to or as an alternative to services explicitly described. As described, each of the services 608-24 may include one or more web service interfaces that enable the client computer system 604 to submit appropriately configured API calls to the various services through web service requests.

The virtual computer system service 608 may include hardware, software, or combination thereof configured to instantiate virtual machine instances on behalf of the client computer system 604. The client computer system 604 may interact with the virtual computer system service 608 (via appropriately configured and authenticated API calls) to provision and operate virtual computer systems that are instantiated on physical computing devices hosted and operated by the computing resource service provider 602. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 608 is shown in FIG. 6, any other computer system or computer system service may be utilized in the computing resource service provider 602, such as a computer system or computer system service that does not employ virtualization or instantiation and instead provisions computing resources on dedicated or shared computers/servers and/or other physical devices.

The data storage service 610 may comprise one or more computing resources that collectively operate to store data for a client computer system 604. In an embodiment, the data storage service 610 utilizes block-level storage devices (and/or virtualizations thereof) to store data or portions thereof on behalf of clients. In an embodiment, data storage devices of the data storage service 610 are operationally attached to virtual computer systems provided by the virtual computer system service 608 to serve as logical units (e.g., virtual drives) for the computer systems. A data storage device, in an embodiment, enables the persistent storage of data used/generated by a corresponding virtual computer system where the virtual computer system service 608 may only provide ephemeral data storage.

In an embodiment, the database management service 612 comprises one or more computing resources that collectively implement a database management system such as an object-relational database management system (ORDBMS) or relational database management system (RDBMS). In an embodiment, the database management service implements a database system utilizing various other services of the computing resource service provider. In an embodiment, the database management system runs database management software using the virtual computer system service 608 and stores data files and log files using the data storage service 610.

A data analytics/machine-learning service 620, in an embodiment, comprises and/or utilizes one or more computing resources that implements various services for analyzing data sets, such as by applying machine-learning algorithms to data sets and determining patterns within sets of data. In an embodiment, a data analytics/machine-learning service 620 utilizes a machine-learning algorithm to determine how to generate test code from a test specification template. In an embodiment, a machine-learning algorithm utilizes a neural network, Markov chain, or other suitable machine-learning model to determine a mapping between statements encoded in a test specification template with code (e.g., executable code) that performs one or more operations in connection with a database environment. In an embodiment, the data analytics/machine-learning service 620 utilizes the virtual computer system service 608 to generate a machine-learning model and/or run a machine-learning algorithm, utilizes the data storage service 610 to store and/or retrieve data sets (e.g., training data and evaluation data) used to train the machine-learning model, and utilize the database management service 612 to interact with a database system. In an embodiment, the machine-learning algorithm is performed in the context of a database migration process that is managed by the database migration service 614.

In an embodiment the database migration service 614 comprises one or more computing resources that collectively perform a database migration. In an embodiment, the database migration service 614 is a service separate from the database management service 612 (e.g., there are separate interfaces for accessing the respective services), although such need not be the case—in an embodiment, database migration processes is performed by the database management service. A database migration process or an aspect thereof is, in an embodiment, described in connection with FIGS. 7 and 8. In an embodiment, a database migration service 614 utilizes computing resources of the computing resource service provider such as virtual machine instances of the virtual computer system service 608 to run software that performs database migration processes described in accordance with embodiments described elsewhere in this disclosure, such as in connection with FIGS. 1, 7, and 8. In an embodiment, the database migration service 614 refers to one or more computer servers (or virtualizations thereof) that are configured with executable code that, if executed by one or more processors of the one or more computer servers (or virtualizations thereof) performs database migration related services, such as those described in connection with the database specification generation module and test code generation module discussed in connection with FIG. 1 and elsewhere. In an embodiment, the executable code includes the database specification generation module and/or test code generation module described in connection with FIG. 1. In an embodiment, the executable code is in the form of software applications, libraries (e.g., dynamically and/or statically linked libraries), scripts, and any other suitable form of executable code executing and/or executable in the context of the operation of the database migration service 614.

In the environment illustrated in FIG. 6, a notification service 616 is included. The notification service 616 may comprise hardware, software, or combination thereof configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 616 may provide notifications to clients using a "push" mechanism without the need to periodically check or "poll" for new information and updates. The notification service 616 may further be used for various purposes such as monitoring applications executing in the virtual computer system service 608, workflow systems, time-sensitive information updates, mobile applications, and many others. In an embodiment, a database management service 612 utilizes the notification service 616 as a mechanism for clients of a database system to subscribe for and receive notifications related to changes in the database—in an embodiment, a notification is used to signal the completion and status of various aspects of a database migration process.

As illustrated in FIG. 6, the computing resource service provider 602, in various embodiments, includes an authentication system 618. The authentication system 618, in an embodiment, is a computer system (i.e., collection of computing resources) configured to perform operations involved in authentication of users of the customer. For instance, one of the services 608-16 and 620-24 may provide information from a user to the authentication service 618 to receive information in return that indicates whether the user requests are authentic.

The computing resource service provider 602, in various embodiments, is also equipped with a task service 622. The task service 622 is configured to receive a task package from the client computer system 604 and enable executing tasks as dictated by the task package. The task service 622 may be configured to use any resource of the computing resource service provider 602, such as one or more instantiated virtual machines or virtual hosts, for executing the task. The task service 622 may configure the one or more instantiated virtual machines or virtual hosts to operate using a selected operating system and/or a selected execution application in accordance with a requirement of the client computer system 604.

The computing resource service provider 602 additionally maintains one or more other services 624 based at least in part on the needs of its clients. For instance, the computing resource service provider 602 may maintain a database service for a client and/or client computer system 604. A database service may hardware software, or combination thereof configured to run one or more databases for one or more client computer system 604. The client computer system 604 may operate and manage a database from the database service by utilizing appropriately configured API calls. This, in turn, may allow a client computer system 604 to maintain and potentially scale the operations in the database. Other services include, but are not limited to, object-level archival data storage services, services that manage and/or monitor other services.

Figure 7:
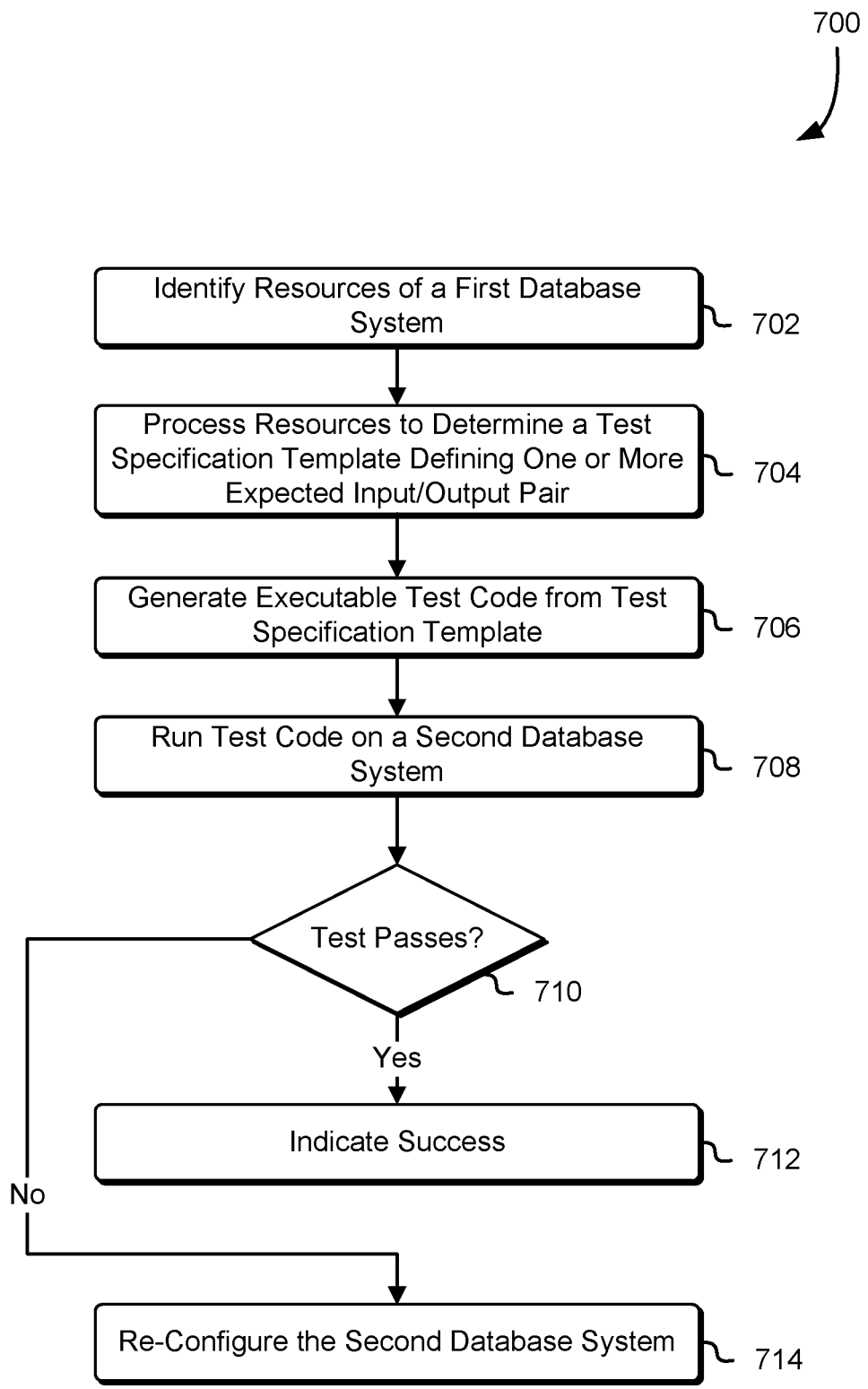
FIG. 7 illustrates a process for automated database migration verification, in accordance with one embodiment.

FIG. 7 shows an illustrative example of a process that, as a result of being performed by a suitable system, implements an automated database migration verification process. The process illustrated in the flowchart 700 may, generally speaking, be performed by any suitable computing entity such as by a database migration service and/or a database management service of a computing resource service provider, a server computer system, and more. In an embodiment, the process illustrated in FIG. 7 is performed in accordance with system described in connection with FIGS. 1-3 as well as other embodiments described in connection with other figures of the disclosure.

In an embodiment, a suitable system such as a service of a computing resource service provider includes executable code that, if executed by one or more processors, causes the one or more processors to identify 702 resources of a first database system. In an embodiment, the database migration process is a migration of data and functionality from a first operating environment (e.g., operation of the first database system) to a second operating environment (e.g., operation of a second database system). In an embodiment, the resources identified by the system include source code, stored procedures (sprocs), database schema, APIs, existing tests, user interface, design documents, input/output data, etc. that is information usable to determine the expected outcome of an operation of a second database system. In an embodiment, the expected outcome is determined based at least in part on one or more inputs. In an embodiment, the migration process involves the migration from a first database management platform to a second database management platform. In an embodiment, the first database system is an Oracle®-based database system and the second database system is a PostgreSQL-based database system. However, it need not be the case that the databases use different platforms—in an embodiment, an organization that runs a MySQL-based database system using on-premises computer systems utilizes a database migration process as described herein to migrate to a MySQL-based database system hosted by one or more servers of a computing resource service provider and, in this way, off-loads database-related services to the computing resource service provider, thereby reducing or eliminating costs related to the organization maintaining and managing computer hardware for the database system. In an embodiment, the system is a service of a computing resource service provider that hosts the second database system on one or more computer servers and a client of the computing resource service provider hosts the first database system on a client computing device in accordance with embodiments described elsewhere in connection with FIGS. 1 and 2. In an embodiment, the system identifies or otherwise determines a set of resources (also referred to as a set of parameters) associated with the first database system that are usable to create, initialize, instantiate, or otherwise provision a second database system. In an embodiment, the set of resources is identified by a client computer system with access to a first database system in accordance with embodiments such as those described elsewhere in this disclosure, such as in connection with FIG. 1.

In an embodiment, the set of resources or a portion thereof are utilized to determine a set of parameters for a second database system by querying a set of configuration settings from the first database setting such as settings related to the administration of the database, database schema, indexing information, and more. In an embodiment, the second database system is created, initialized, instantiated, configured, or otherwise provisioned in accordance with the determined set of parameters. In an embodiment, at least some of the configuration parameters of the first database system map to respective configuration parameters of the second database system and values and setting parameters are configured to match according to the mapping.

A computing resource service provider, in accordance with one embodiment, hosts multiple services, such as a database management service as described in connection with other figures. In an embodiment, the database management service is used by the computing resource service provider to host multiple database systems and/or database servers for multiple clients which may also be multiple customers of the computing resource service provider. In an embodiment, the client, as part of a database migration process, provides the set of parameters or a portion thereof to the database management service and the database management service creates, initializes, instantiates, configures, or otherwise provisions a database system for the client response to receiving the set of parameters or a portion thereof, perhaps in connection with a request. In an embodiment, the database management system allocates computing resources of the computing resource service provider as part of the creation of a database system in response to a database migration request, and the allocation includes, in some cases, the use and/or allocation of resources from other services of the computing resource service provider—in an embodiment, in order to create a database server, a database management service utilizes a virtual computer system service to initialize a virtual machine instance (or more generally, one or more compute instances suitable for operating a database management system such as a RDBMS or an ORDBMS) and a database that stores the underlying data utilizes a data storage service to persist the data (e.g., in a database file or a data file), one or more log files (e.g., a database transaction log), and other data that is persisted in a durable manner.

The system, in accordance with one embodiment, processes 704 the identified set of resources to determine a test specification template defining at least one input-output pair that indicates an expected outcome of an operation of a database system as part of a migration process. In an embodiment, the test specification template is generated by a database specification generation module such as those described elsewhere in this disclosure, such as in connection with FIG. 1. In an embodiment, the database specification generation module is a software module that is a part of a database migration service of a computing resource service provider.

In an embodiment, the system, in accordance with a database migration process, generates 706 migration test code using at least the test specification template. In an embodiment, the test specification template is encoded as an XML file and encodes one or more tests, wherein a test comprises: an initial database state; one or more operations to perform, wherein some of the one or more operations include additional inputs encoded as XML; an expected output comprising an expected database state; additional operations to perform as part of a validation; and more. In an embodiment, a test code generation module is a software subsystem (e.g., software module) of a service of a computing resource service provider that includes executable code that, if executed by one or more processors of the service, cause the one or more processors to obtain the test specification template; and generate test code. In an embodiment, the system generates the test code by at least: parsing the test specification template to determine an initial database state; determining executable code that, if executed, causes a database system to satisfy the initial database state, determine a set of operations and inputs to the operations; generating corresponding executable code that, if executed, causes the operations and the inputs to be performed by the database system; determining an expected outcome; and generating corresponding executable code that, if executed, verifies whether the actual outcome of performing the operations on the database system satisfies the expected outcome.

In an embodiment, the system runs 708 the test code in connection with the second database system, which is also referred to as the target database of the database migration process. In an embodiment, the test code is executed by the test code generation module or any other suitable system. In an embodiment, the database migration service runs the test code on a different subsystem or delegates the execution of the test code to another service such as a virtual computer system service.

After running the test code, the system determines whether 710 the test or tests passed. In an embodiment, whether a particular test passes is determined at least in part based on the corresponding test specification template. In an embodiment, the test specification template specifies an expected ending database state, such as an expectation that a certain number of database records exist after running the test, the contents of certain database records are particular values, and so on. In an embodiment, satisfaction of the expected outcomes does not require the actual outcome to literally match the expected outcome, but rather, logically determining that two data objects include data that match each other is sufficient. In an embodiment, a data object of a first database system is represented in a first format and a second database system encodes a database object in a different format, but logically encodes the same data.

Figure 9:
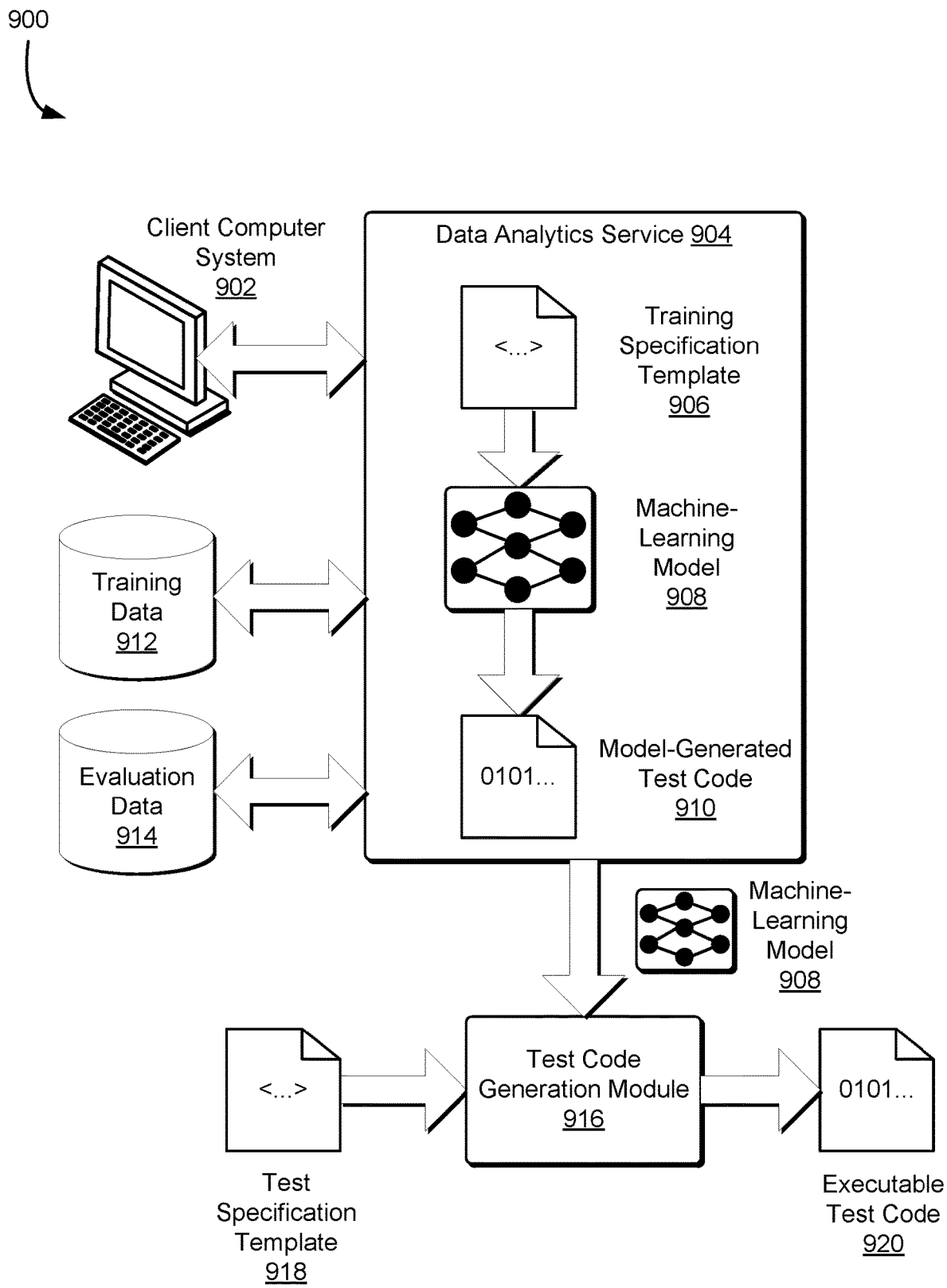
FIG. 9 illustrates a diagram of a system that uses a machine-learning model to generate executable test code, in accordance with one embodiment.

In an embodiment, if the test passes, the system indicates 712 that the test passed. In an embodiment, a successful database migration requires the passage of all tests and/or all tests of a subset of tests (e.g., certain critical tests that considered high priority for the operation of the database). In an embodiment, a passage rate of an aggregate set of tests above a threshold (e.g., a threshold specified by a client organization) is used to determine whether the database migration succeeded. If the test fails, the system, in an embodiment, indicates a failure. In an embodiment, if the test fails, the system re-configures 714 the second database system by analyzing the failure, performing a root cause determination, and determining a mitigation. In an embodiment, the analysis of the failure occurs with the use of logging state information of the second database system successively throughout the test run and determining, at the point of failure, which specific operation and/or command caused the failure, and performing a mitigation. In an embodiment, the mitigation is to update the database schema of the second database based on the expected outcome defined in the test specification template and the actual outcome—in an embodiment, if the expected outcome is that a record should be created in a particular table and the actual outcome is that a failure occurred indicating that the table does not exist, the mitigation is to re-configure the database by creating the particular table. In an embodiment, machine-learning techniques such as those described in connection with FIG. 9 are utilized to analyze errors and/or determine mitigations. In either case, the system, in an embodiment, generates a report that includes a report of the various aspects of the migration testing, such as a list of operations that were tested, code coverage information (e.g., a summary and/or detailed information regarding which code branches of the database system were executed and validated as part of the test scripts), and more.

Figure 8:
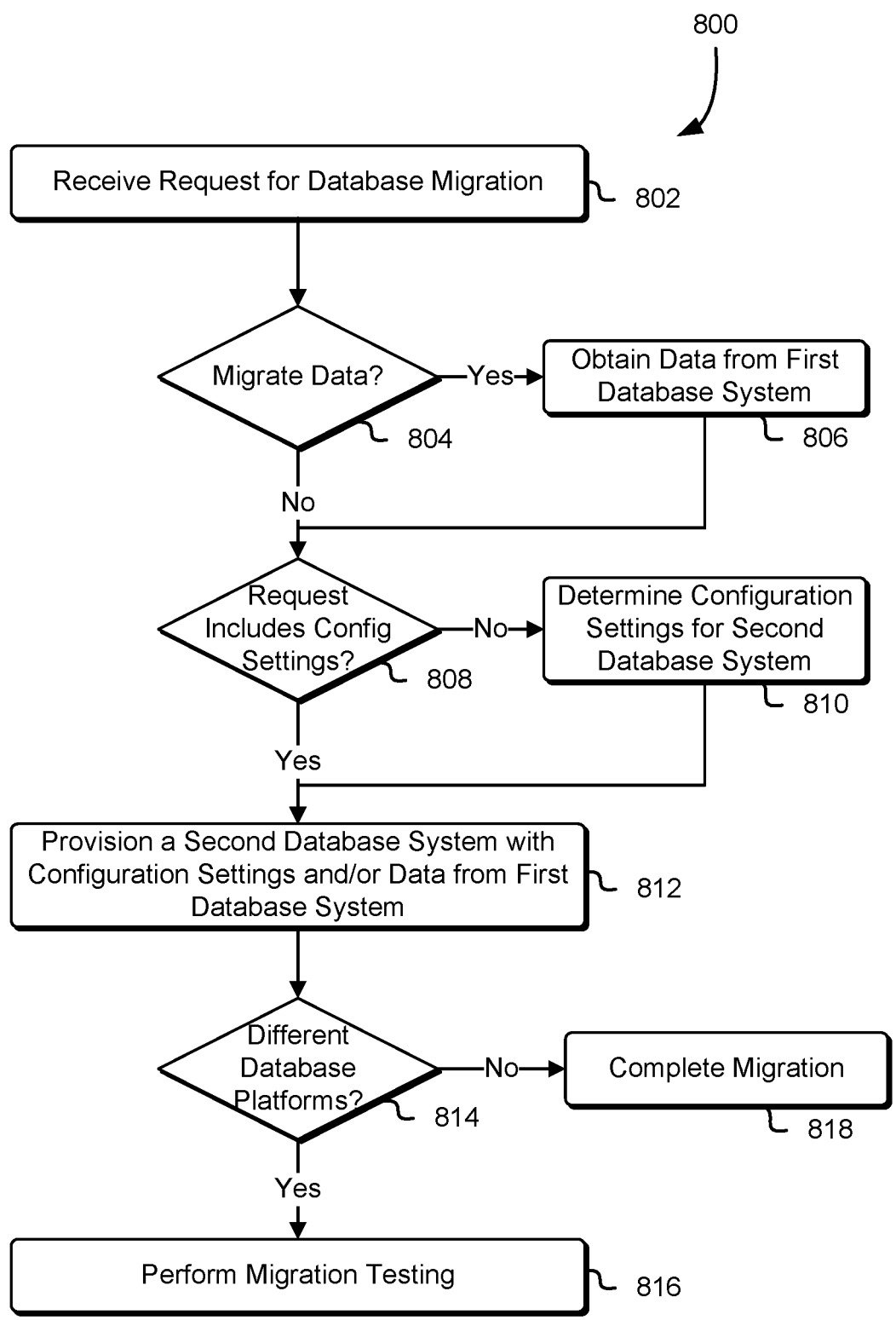
FIG. 8 illustrates a process for database migration, in accordance with one embodiment.

FIG. 8 shows an illustrative example of a process that, as a result of being performed by a suitable system, implements a database migration process. The process illustrated in the flowchart 800 may, generally speaking, be performed by any suitable computing entity such as by a database migration service and/or a database management service of a computing resource service provider, a server computer system, and more. In an embodiment, the process illustrated in FIG. 8 is performed in accordance with system described in connection with FIGS. 1-3 as well as other embodiments described in connection with other figures of the disclosure.

In an embodiment, the system receives 802 a request to perform a database migration. The request is any suitable request and, in an embodiment, is in the form of a web service API call to a service of a computing resource service provider. Upon receiving the request, the system determines whether 804 to migrate data as part of the migration request. In an embodiment, the request indicates that data should be transferred as part of the migration and the system obtains 806 data from a first database system to transfer. In an embodiment, the data to transfer is accessed via database API requests to a database management system; in an embodiment, a data file that stores the contents of the database is copied in-kind (e.g., the entire data file and/or transaction log file is copied). In an embodiment, the system determines whether 808 the request includes configuration settings. In an embodiment, the configuration settings are usable to generate a test specification template. If the request does not include configuration settings, the system determines 810 the configuration settings by querying the first database system for database volume settings, database schema, and more. In an embodiment, the system uses the configuration settings and/or data (if the request indicates data should be migrated) from the first database to provision 812 a second database system. In an embodiment, provisioning the second database system includes allocating computing resources of a computing resource service provider to run the second database system.

In an embodiment, the system determines whether 814 the first database system and the second database system are different database platforms. In an embodiment, different platforms refer to difference database technologies, such as an upgrade of an older version of a database management system application to a newer version of the same database management system application. In an embodiment, different platforms refer to different database technologies. In an embodiment, a database migration process involves the migration of an Oracle®-based database system to a PostgreSQL-based database system.

If the database platforms are different, the system performs 816 migration testing using processes described in this disclosure, such as those described in connection with FIG. 7. In an embodiment, the system includes executable code that, if executed by a suitable system, causes the system to: identify a set of resources associated with an operation of the first database system; process the set of resources to determine a test specification template that includes, among other data, an expected outcome of the operation of the second database system; and generate, based at least in part on the set of resources and at least part of the test specification template, executable test code that, if executed, verifies an actual outcome of the operation of the second database system against the expected outcome encoded in the test specification template. In an embodiment, if the system platforms are the same, then the system completes 818 the migration without performing the automated migration verification process, but such need not be the case—in an embodiment, a test specification template is generated and a subset of the tests in the executable test code generated from the test specification template are run, so as to verify that fundamental and/or critical operations of the second database system behave as expected.

FIG. 9 illustrates a diagram of a system 900 in which an embodiment in accordance with this disclosure is implemented to utilize a data analytics service to generate a machine-learning model that is utilized to generate test code. In an embodiment, a client computer system 902 is any suitable computer system that submits requests to the data analytics service 904, such as through the use of a web service API. Services such as those described elsewhere in this embodiment are suitable clients, such as the database migration service, the task service, and other services, in accordance with at least one embodiment. In an embodiment, the client computer system 902 is a database migration service that submits a request to the data analytics service to generate a machine-learning model. In an embodiment, a task service such as those described elsewhere in this disclosure is utilized to request the generation or re-generation of a machine-learning model in connection with one or more conditions, such as on a periodic basis or upon the detection of an event (e.g., a suitable event is a passage rate of a migration falling below a predefined threshold).

In an embodiment, a data analytics service 904 is a fleet of one or more computing devices that include one or more processors and stores executable code that, if executed by the one or more processors, causes the one or more processors of the fleet to perform data analytics related services, such as generating, configuring, and evaluating machine-learning models. In an embodiment, a data analytics service 904 is one or more computing devices of a computing resource service provider that performed processes or portions thereof to perform machine-learning algorithms such as a machine-learning algorithm to generate a machine-learning model. In an embodiment, the data analytics service is a frontend service of a computing resource service provider that supports a set of web API requests. In an embodiment, the data analytics service supports the API request by fulfilling the request in full, whereas in other cases, the data analytics service sometimes coordinates with other services of a computing resource service provider to fulfill the request, such services discussed in connection with FIG. 6. A data analytics service 904, in an embodiment, receives a request (e.g., a web service API call) to generate a machine-learning model that maps code, tags, operations, data, or other information encoded in a test specification template to code (e.g., source code) usable to exercise one or more operations of a database system, server, and/or environment. In an embodiment, the data analytics service 904 is implemented in accordance with systems described in connection with embodiments described elsewhere in this disclosure, such as in accordance with embodiments described elsewhere in connection with FIG. 6.

In an embodiment, a data source is partitioned into two mutually exclusive subsets that are, respectively, training data 912 for training a machine-learning model and evaluation data 914 for evaluating the quality of the model. The quality of a model, in an embodiment, is defined by how accurate a machine-learning model generated at least in part from the training data 912 is at predicting the result of the evaluation data 914 given inputs of data of the evaluation data. In an embodiment, the client specifies a shuffle type to mix the order of in which the training data is encountered by the machine-learning algorithm. In an embodiment, a client can specify the ratio and/or distribution of data of the data source as between the training data 912 and evaluation data 914. In an embodiment, a client specifies a data source that includes a correct mapping from a test specification format (e.g., XML) to code (e.g., executable code) for a database environment or platform. In an embodiment, a mapping includes an XML tag for a database write operation that is associated with executable code that, if executed in the context of the database environment or platform, causes a respective database system to perform the database write operation.

In an embodiment, a machine-learning model 908 is a neural network, Markov chain, or other suitable machine-learning model that maps an input (e.g., tags in XML or JSON format) to executable test code suitable for use with a specified database environment. In an embodiment, a machine-learning model is generated using any suitable machine-learning algorithm such as a multinomial logistic regression algorithm. In an embodiment, a training specification template 906 is obtained from the training data 912 and is an input to a machine-learning model 908 that generates an output comprising the model-generated test code 910 illustrated in FIG. 9. In an embodiment, the data analytics service 904 compares the model-generated test code 910 against the evaluation data 914 to determine whether the output generated by the model is correct. It should be noted that correctness in this context does not, in an embodiment, refer to a literal comparison of executable instructions included in the evaluation code and model-generated code, but rather an evaluation of whether the evaluation code and model-generated code both result in the same operation of a database system. The machine-learning model 908, in an embodiment, can be iteratively refined by subsequent training runs and/or by modifying various hyper-parameters or training parameters connected to the machine-learning process.

In an embodiment, a test code generation module 916 is in accordance with those described elsewhere, such as in connection with FIGS. 1 and 5. In an embodiment, the machine-learning model is provided to the test code generation module 916 in response to a web API request for the model. In an embodiment, the test code generation module receives a test specification template 918 as part of a database migration process and generates executable test code 920 using the received test specification template 918 and machine-learning model. In an embodiment, the executable test code 920 is generated as part of a database migration process, such as those described in connection with FIG. 7.

Figure 10:
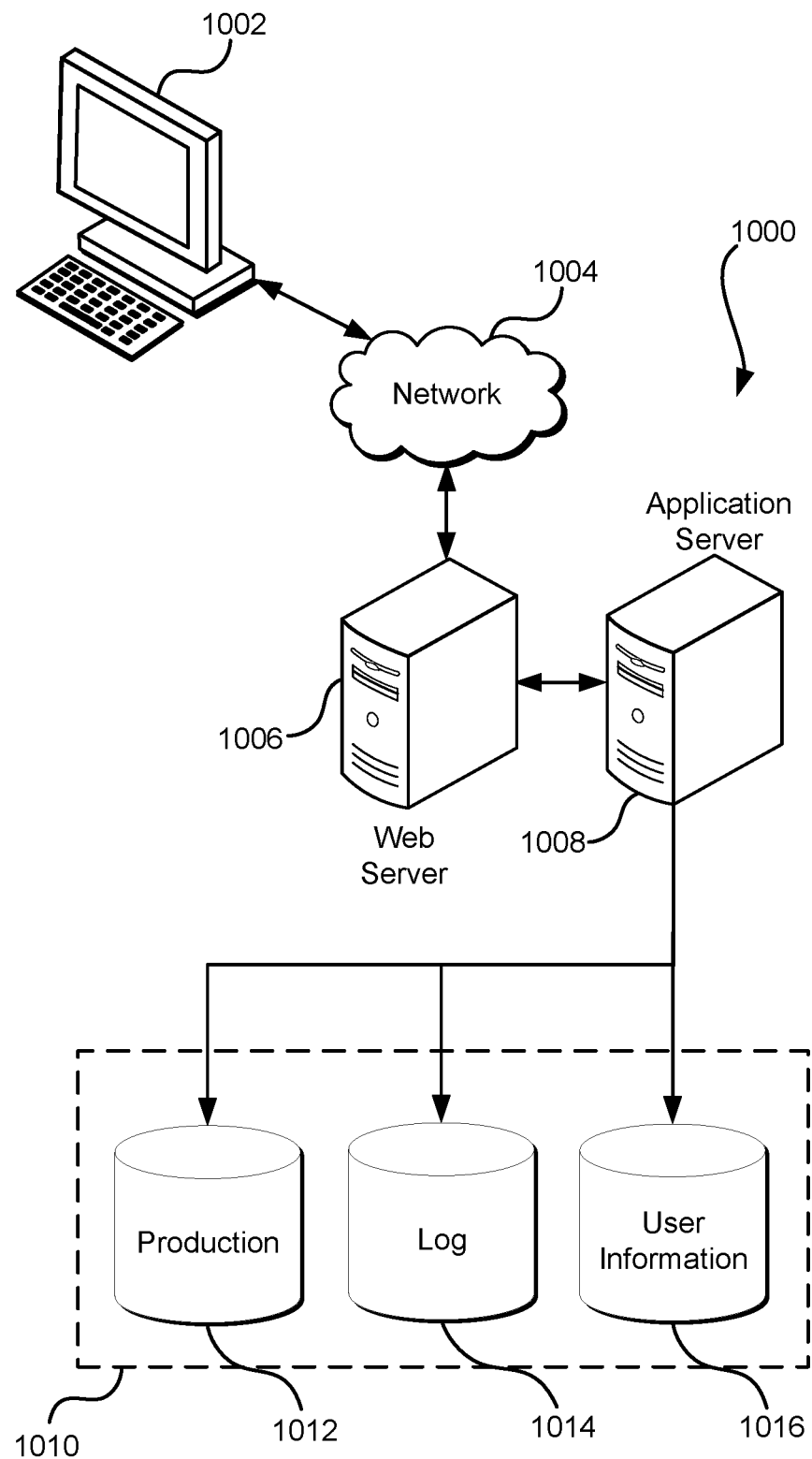
FIG. 10 illustrates a system in which various embodiments can be implemented, in accordance with one embodiment.

FIG. 10 illustrates aspects of an example system 1000 for implementing aspects in accordance with various embodiments. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. In an embodiment, client devices include personal computers, cell phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices or virtual computer systems and refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. The application server can include any appropriate hardware, software and firmware for integrating with the data store as needed to execute aspects of one or more applications for the client device, handling some or all of the data access and business logic for an application. In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CS S"), JavaScript Object Notation (JSON), and/or another appropriate client-side structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, analysis or other such purposes. In an embodiment, other aspects such as page image information and access rights information are stored in the data store in any of the above listed mechanisms as appropriate or in additional mechanisms in the data store 1010. The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item and the data store accesses the user information to verify the identity of the user, accesses the catalog detail information to obtain information about items of that type, and returns the information to the user, such as in a results listing on a web page that the user views via a browser on the user device 1002. Continuing, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content.

In an embodiment, each server typically includes an operating system that provides executable program instructions for the general administration and operation of that server and includes a computer-readable storage medium (e.g., a hard disk, random access memory, read only memory, etc.) storing instructions that, when executed (i.e., as a result of being executed) by a processor of the server, allow the server to perform its intended functions.

The system, in an embodiment, is a distributed and/or virtual computing system utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular, wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. In an embodiment, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. In connection with the discussion of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors. In an embodiment, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   identifying a first database schema of a first database system associated with a first database platform;
   generating, based at least in part on the first database schema, a template that encodes an operation and an expected outcome of the operation performed using the first database system;
   generating, based at least in part on the template, first executable code that, upon execution, causes a second database system operating on a second database platform to perform the operation and generate a first actual outcome of the operation, wherein the template is used to generate second executable code that, upon execution, causes the second database system operating on a different database platform to perform the operation and generate a second outcome of the operation that is used, based at least in part on the expected outcome, to determine whether to update a second database schema of the second database system;

causing execution of the first executable code to generate the first actual outcome;

processing the first actual outcome, the expected outcome, and the second database schema of the second database system to generate an update to the second database schema; and causing the second database system to operate based at least in part on the update.

2. The computer-implemented method of claim 1, further comprising:

transferring data from the first database system to the second database system,
   wherein the expected outcome is determined based at least in part on the data, and
   wherein the execution of the first executable code causes the second database system to perform the operation on at least part of the data transferred to the second database system.

3. The computer-implemented method of claim 1, wherein the template is encoded in a JavaScript Object Notation (JSON) format.

4. The computer-implemented method of claim 1, wherein the first database system and the second database system have different database management platforms.

5. A system, comprising memory to store instructions, which if performed by one or more processors, cause the system to at least:

identify a set of resources associated with a first database system operating on a first database platform;

identify configuration settings and data associated with the set of resources;

determine, based at least in part on the configuration settings and the data, an expected outcome of an operation of a second database system operating on a second database platform; and generate, based at least in part on the configuration settings, the data, and the expected outcome, first executable code that, if executed, verifies a first actual outcome of the operation of the second database system against the expected outcome, wherein the configuration settings, the data, and the expected outcome are used to generate different executable code that, if executed, verifies a second outcome of the operation of the second database system operating on a different database platform, against the expected outcome.

6. The system of claim 5, wherein the instructions performed by the one or more processors further cause the system to:

determine a set of parameters for the second database system based at least in part on the configuration settings of the first database system; and configure the second database system in accordance with the set of parameters.

7. The system of claim 5, wherein the instructions performed by the one or more processors further cause the system to allocate computing resources for the second database system.

8. The system of claim 5, wherein the instructions performed by the one or more processors further cause the system to:

select a unit test that performs the operation using an input; and determine the expected outcome of performing the operation on the input using the second database system.

9. The system of claim 8, wherein the first executable code comprises instructions that, if executed in association with the second database system, cause the second database system to perform the operation using the input, thereby generating the expected outcome.

10. The system of claim 5, wherein the system is a service of a computing resource service provider that hosts the second database system on one or more computer servers and a client of the computing resource service provider hosts the first database system on a client computing device.

11. The system of claim 6, wherein the set of parameters comprises a database schema of the first database system.

12. The system of claim 5, wherein the first database system and the second database system use a same type of database management platform.

13. A non-transitory computer-readable storage medium having stored thereon executable instructions that, if executed by one or more processors of a computer system, cause the computer system to at least:

in response to a request to migrate a first database system from a first type of database management system on the first database system to a second type of database management system on a second database system, identify a set of parameters associated with the first database system;

generate a template based at least in part on the set of parameters, wherein the template encodes one or more expected outcomes of an operation of the second database system implemented using the second type of database management system; and generate, based at least in part on the template, executable code that, if executed by the one or more processors, causes the computer system to verify one or more first actual outcomes of the operation of the second database system against the one or more expected outcomes, wherein the template is used to generate a second set of executable code that, if executed by the one or more processors, causes the computer system to verify one or more second outcomes of the operation of the second database system implemented using a different type of database management system against the one or more expected outcomes.

14. The non-transitory computer-readable storage medium of claim 13, wherein the instructions further comprise instructions that, if executed by the one or more processors, further cause the computer system to:

run the executable code in connection with the second database system, thereby generating the one or more first actual outcomes; and verify whether the one or more first actual outcomes match the one or more expected outcomes.

15. The non-transitory computer-readable storage medium of claim 13, wherein the template comprises:

an input state;

the operation; and an output state.

16. The non-transitory computer-readable storage medium of claim 15, wherein the instructions that cause the computer system to generate the executable code further include instructions that cause the computer system to:

generate a first subset of the executable code based at least in part on the input state, wherein the first subset, if executed by the one or more processors, causes the computer system to provision the second database system to the input state;

generate a second subset of the executable code based at least in part on the operation, wherein the second subset, if executed by the one or more processors, causes the operation to be performed in connection with the second database system; and generate a third subset of the executable code based at least in part on the output state, wherein the third subset, if executed by the one or more processors, causes the computer system to verify whether the second database system satisfies the output state after the operation is performed.

17. The non-transitory computer-readable storage medium of claim 13, wherein:

the template encodes the one or more expected outcomes of the operation of the second database system implemented using the different type of database management system;

the instructions further comprise instructions that, if executed by the one or more processors, further cause the computer system to:

determine a target platform; and in response to determining the target platform is associated with the second database system implemented using the different type of database management system, generate the second set of executable code based at least in part on the template that, if executed, verifies the one or more second outcomes of the operation of the second database system implemented using the different type of database management system against the one or more expected outcomes; and the instructions to generate the executable code further comprise instructions that, if executed by the one or more processors, further cause the computer system to generate the executable code in response to determining the target platform is associated with the second database system.

18. The non-transitory computer-readable storage medium of claim 13, wherein the instructions further comprise instructions that, if executed by the one or more processors, further cause the computer system to transfer data from the first database system to the second database system.

19. The non-transitory computer-readable storage medium of claim 13, wherein the different type of database management system of the second database system is an object-relational database management system (ORDBMS).

20. The non-transitory computer-readable storage medium of claim 18, wherein the instructions to transfer the data from the first database system to the second database system further comprise instructions that, if executed by the one or more processors, further cause the computer system to transfer the data to a network-attachable transfer device.

21. The system of claim 5, wherein the first executable code or the different executable code is generated using a machine-learning model generated in response to a request to migrate the first database system operating on the first database platform to the second database system operating on the second database platform.

* * * * *